United States Patent
Pedersen et al.

(10) Patent No.: US 9,548,850 B2
(45) Date of Patent: Jan. 17, 2017

(54) ASSIGNMENT OF COMPONENT CARRIERS

(75) Inventors: Klaus Ingemann Pedersen, Aalborg (DK); Yuanye Wang, Tustin, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 393 days.

(21) Appl. No.: 13/578,374

(22) PCT Filed: Feb. 11, 2010

(86) PCT No.: PCT/EP2010/051674
§ 371 (c)(1),
(2), (4) Date: Sep. 10, 2012

(87) PCT Pub. No.: WO2011/098124
PCT Pub. Date: Aug. 18, 2011

(65) Prior Publication Data
US 2012/0327878 A1 Dec. 27, 2012

(51) Int. Cl.
H04L 5/00 (2006.01)
(52) U.S. Cl.
CPC ............ H04L 5/006 (2013.01); H04L 5/001 (2013.01)
(58) Field of Classification Search
CPC ....... H04W 28/00; H04W 72/00; H04L 5/006; H04L 5/001
USPC ................. 370/329, 235; 455/450
See application file for complete search history.

(56) References Cited

U.S. PATENT DOCUMENTS

| | | | |
|---|---|---|---|
| 2004/0151131 A1* | 8/2004 | Schneider | H04B 1/56 370/276 |
| 2005/0237942 A1* | 10/2005 | Lewis et al. | 370/241 |
| 2009/0052322 A1* | 2/2009 | Simonsson | H04W 28/20 370/235 |
| 2010/0081439 A1* | 4/2010 | Sie et al. | 455/436 |
| 2010/0118720 A1* | 5/2010 | Gauvreau | H04W 72/048 370/252 |
| 2010/0267394 A1* | 10/2010 | Wu | H04W 24/10 455/450 |
| 2010/0291956 A1* | 11/2010 | Iwamura | H04W 48/20 455/509 |

FOREIGN PATENT DOCUMENTS

| | | |
|---|---|---|
| EP | 2391180 A1 | 11/2011 |
| JP | H08051662 A | 2/1996 |

(Continued)

OTHER PUBLICATIONS

Luis G. U. Garcia et. al. "Autonomous Component Carrier Selection: Interference Management in Local Area Environments for LTE-Advanced", IEEE Communications Magazine, Sep. 2009, pp. 110-116.*

(Continued)

*Primary Examiner* — Andrew Lai
*Assistant Examiner* — Sumitra Ganguly
(74) *Attorney, Agent, or Firm* — Harrington & Smith (57) ABSTRACT

Assignment of component carriers Carrier aggregation, and assignment of component carriers is disclosed. In a method a capability of a communication device for carrier aggregation of a plurality of component carriers is determined. Loading of at least one of the component carriers is determined. The communication device is assigned to one or more of the component carriers on the basis of determining the capability and determining the loading.

22 Claims, 7 Drawing Sheets

(56) References Cited

FOREIGN PATENT DOCUMENTS

| JP | H09172674 A | 6/1997 |
|---|---|---|
| JP | 2007511180 A | 4/2007 |
| WO | WO 2009072957 A1 | 6/2009 |

OTHER PUBLICATIONS

Luis G.U. Garcia et. al. "Autonomous Component Carrier Selection: Interference Management in Local Area Environments for LTE-Advanced", IEEE Communications Magazine, Sep. 2009, pp. 110-116.*

3GPP TR 36.912 V9.1.0 (Dec. 2009), "$^{rd}$ Generation Partnership Project; Technical Specification Group Radio Access Network; Feasibility study for Further Advancements for E-UTRA (LTE-Advanced) (Release 9)", 58 pgs.

R1-093861. 3GPP TSG-RAN WG1 Meeting #58 bis, Miyazaki, Japan, Oct. 12-16, 2009, "PHICH carrier linkage for carrier aggregation" NEC Group, 7 pgs.

Garcia, L.G.U., et al, "Autonomous Component Carrier Selection: Interference Management in Local Area Environments for LTE-Advanced", © 2009 IEEE, 7 pgs.

Garcia, L.G.U., et al, "Autonomous Component Carrier Selection for Local Area Uncoordinated Deployment of LTE-Advanced", © 2009 IEEE, 5 pgs.

Nokia et al.; "Carrier aggregation configurations and DL/UL linkage"; R1-093902; 3GPP TSG RAN WG1 Meeting #58bis; Miyazaki, Japan, Oct. 12-16, 2009; whole document (4 pages).

Nokia et al.; "Carrier aggregation configurations and DL/UL linkage"; R1-094642; 3GPP TSG RAN WG1 Meeting #59; Jeju, Korea, Nov. 9-13, 2009; whole document (4 pages).

Huawei; "Carrier aggregation in active mode"; R2-093104; 3GPP TSG-RAN WG2 Meeting #66; San Francisco, USA, May 4-8, 2009; whole document (4 pages).

Huawei; "Component Carrier Management with DRX Consideration in LTE-Advanced"; R2-093922; 3GPP TSG-RAN WG2 Meeting #66bis; Los Angeles, USA, Jun. 29-Jul. 3, 2009; whole document (3 pages).

Huawei; "CA cell operations"; R2-094749; 3GPP TSG RAN WG2 Meeting #67; Shenzhen, China, Aug. 24-Aug. 28, 2009; whole document (3 pages).

Huawei; "CC management issues"; R2-096488; 3GPP TSG-RAN2 #68 meeting; Jeju, Korea, Nov. 9-Nov. 13, 2009; whole document (6 pages).

Huawei; "Consideration on carrier aggregation for home eNB"; R1-090817; 3GPP TSG RAN WG1 meeting #56; Athens, Greece, Feb 9-13, 2009; whole document (3 pages).

Catt et al.; "Discussion on UE behavior during initial access with carrier aggregation"; R1-092790; 3GPP TSG RAN WG1 meeting #57bis; Los Angeles, USA, Jun. 29-Jul. 3, 2009; whole document ( 2 pages).

3GPP TS 36.214 V9.0.0 (Dec. 2009) "3rd Generation Partnership Project; Technical Specification Group Radio Access Network; Evolved Universal Terrestrial Radio Access (E-UTRA); Physical layer—Measurements (Release 9)"; pp. 1-13; 3rd Generation Partnership Project (3GPP); Mobile Competence Centre; 650, Route des Lucioles; F-06921 Sophia-Antipolis Cedex; France.

* cited by examiner

ASSIGNMENT OF COMPONENT CARRIERS

TECHNICAL FIELD

The invention relates to carrier aggregation, and in particular to assignment of component carriers.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

Carrier aggregation can be used to increase performance. In carrier aggregation a plurality of carriers are aggregated to increase bandwidth. Carrier aggregation comprises aggregating a plurality of component carriers into a carrier that is referred to in this specification as aggregated carrier.

The communication system and associated devices typically operate in accordance with a given standard or specification which sets out what the various entities associated with the system are permitted to do and how that should be achieved. For example, it can be defined if carrier aggregation is used. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases. The aim of the standardization is to achieve a communication system with, inter alia, reduced latency, higher user data rates, improved system capacity and coverage, and reduced cost for the operator. A further development of the LTE is referred to as LTE-Advanced (LTE-A). The LTE-Advanced aims to provide further enhanced services by means of even higher data rates and lower latency with reduced cost.

SUMMARY

A feature of the LTE-Advanced is that it is capable of providing carrier aggregation. In LTE-A two or more component carriers (CCs) can be aggregated in order to support wider transmission bandwidths, such as up to 100 MHz, and/or for spectrum aggregation. It is possible to configure a user equipment (UE) to aggregate a different number of component carriers originating from the same base station, for example a LTE eNode B (eNB), and of possibly different bandwidths in the uplink (UL) and the downlink (DL) component carrier sets.

Figure 4:
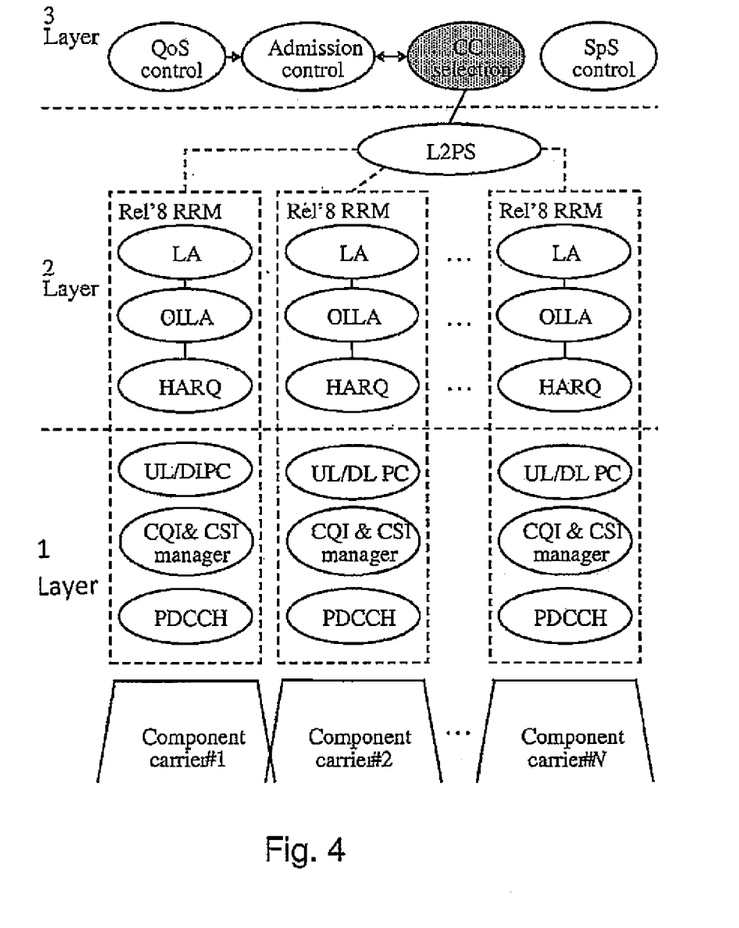
FIG. 4 shows a radio resource management frame work for LTE-Advanced eNode B supporting multiple component carriers according to some embodiments.

An example for a component carrier selection functionality is summarized in FIG. 4 showing the general radio resource management (RRM) frame-work for an LTE-A eNB. Layer-3 can have a component carrier selection functionality. The component carrier selection functionality is responsible for assigning component carriers to the user equipments in a cell. If a user equipment is a 3GPP LTE Release 8 compliant (Rel-8) user equipment, the component carrier selection functionality decides which component carrier the UE is assigned to. In contrast, some LTE-A user equipments may support being assigned to more than one component carrier.

After Layer 3 has assigned the user equipment to a component carrier, dynamic Layer-2 packet scheduling is responsible for scheduling the individual user equipments on the component carriers. A Layer-2 packet scheduler decides the physical resource block allocation of the user equipment within each component carrier.

A problem of component carrier assignment in LTE-A system, or other multi-carrier systems, may exist in achieving a good multi-user frequency domain packet scheduling (FDPS) gain. In some cases Rel-8 user equipments are assigned to a single component carrier and LTE-A user equipments are always assigned on all component carriers. This may reduce performance of the component carriers if too many user equipments are assigned to each component carrier.

It is noted that the above discussed issues are not limited to any particular communication environment, but may occur in any appropriate communication system where carrier aggregation may be provided.

Embodiments of the invention aim to address one or several of the above issues.

In accordance with an embodiment there is provided a method comprising determining a capability of a communication device for carrier aggregation of a plurality of component carriers; determining loading of at least one of the component carriers; and assigning the communication device to one or more of the component carriers on the basis of determining the capability and determining the loading.

In accordance with another embodiment there is provided an apparatus comprising: at least one processor; and at least one memory including computer program code; the at least one memory and the computer program code configured to, with the at least one processor, cause the apparatus at least to: determine a capability of a communication device for carrier aggregation of a plurality of component carriers; determine loading of at least one of the component carriers; and assign the communication device to one or more of the component carriers on the basis of determining the capability and determining the loading.

In accordance with yet another embodiment there is provided an apparatus comprising: capability determining means for determining a capability of a communication device for carrier aggregation of a plurality of component carriers; loading determining means for determining loading of at least one of the component carriers; and assigning means for assigning the communication device to one or more of the component carriers on the basis of determining the capability and determining the loading.

In accordance with a more detailed embodiment the determining may determine the maximum number of component carriers the communication device supports in carrier aggregation. Preferably determining the loading comprises determining the number of communication devices assigned to at least one component carrier. The loading may be determined on the basis of one or more of the following: the number of communication devices assigned to at least one component carrier, required quality of service of the user equipment, and user service quality on a component carrier.

Determining the loading may comprise determining a loading limit for each component carrier. Preferably the loading limit is based on a maximum number of communication devices supported by each component carrier. The assigning may be repeated when the loading of the component carrier is below the loading limit.

In a further embodiment the assigning may be repeated when the number component carriers assigned to the communication device is below the maximum number of component carriers the communication device supports in carrier aggregation.

Preferably, determining the loading comprises determining the component carrier of the plurality of component carriers which has the lowest loading. The assigning can comprise assigning the component carrier with the lowest loading to the communication device. When there is more than one component carrier with the lowest loading, the determining may comprise determining another parameter of the more than one component carriers with the lowest loading. The another parameter may be one or more channel quality parameters relating to a component carrier. The assigning may comprise assigning the communication device to a component carrier when the channel quality parameters meet a predetermined level. Preferably the channel quality parameters are one or more of received interference power, bandwidth of the component carrier, and signal quality condition.

In some embodiments the assigning may comprise assigning the communication device to a single component carrier when the communication device is determined not to support component aggregation.

Carrier aggregation may be provided in accordance with the specifications by the third generation partnership project (3GPP). In some embodiments there is a base station comprising the apparatus. Preferably the base station is an eNode B.

A computer program comprising program code means adapted to perform the method may also be provided.

Various other aspects and further embodiments are also described in the following detailed description and in the attached claims.

BRIEF DESCRIPTION OF THE DRAWINGS

The invention will now be described in further detail, by way of example only, with reference to the following examples and accompanying drawings, in which.

DETAILED DESCRIPTION

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

A communication device can be used for accessing various services and/or applications provided via a communication system. In wireless or mobile communication systems the access is provided via a wireless access interface between mobile communication devices 1 and an appropriate access system 10. A mobile device 1 can typically access wirelessly a communication system via at least one base station 12 or similar wireless transmitter and/or receiver node of the access system. A base station site typically provides one or more cells of a cellular system. In the FIG. 1 example the base station 12 is configured to provide a cell, but could provide, for example, three sectors, each sector providing a cell. Each mobile device 1 and base station may have one or more radio channels open at the same time and may receive signals from more than one source.

Figure 1:
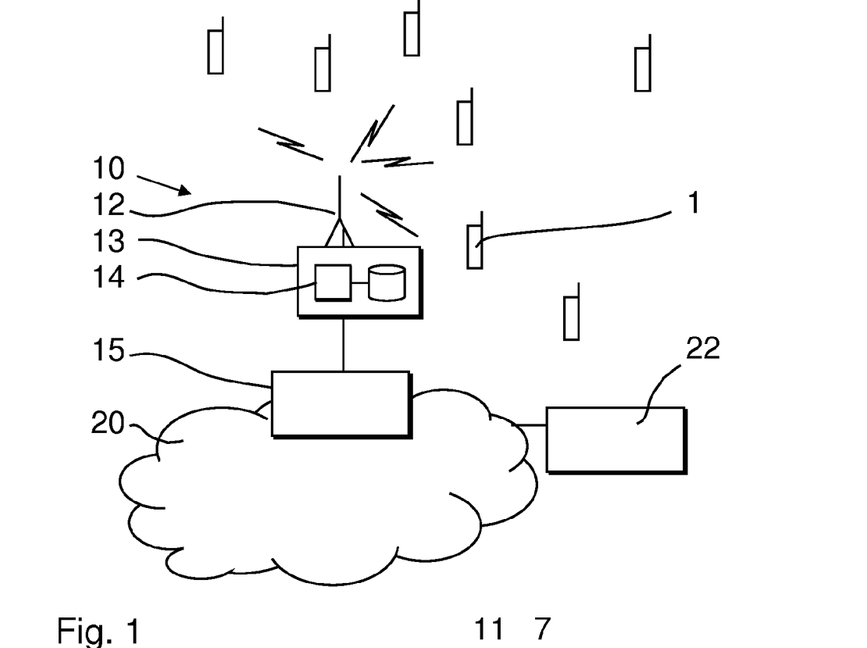
FIG. 1 shows an example of a communication system in which the embodiments of the invention may be implemented.

A base station is typically controlled by at least one appropriate controller so as to enable operation thereof and management of mobile communication devices in communication with the base station. The control entity can be interconnected with other control entities. In FIG. 1 the controller is shown to be provided by block 13. An appropriate controller apparatus may comprise at least one memory, at least one data processing unit and an input/output interface. The controller is thus typically provided with memory capacity and at least one data processor 14. It shall be understood that the control functions may be distributed between a plurality of controller units. The controller apparatus for e base station may be configured to execute an appropriate software code to provide the control functions as explained below in more detail.

In the example shown in FIG. 1, the base station node 12 is connected to a data network 20 via an appropriate gateway 15.

A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks. In some embodiments the base station node is an eNode B.

A communication device can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

Figure 2:
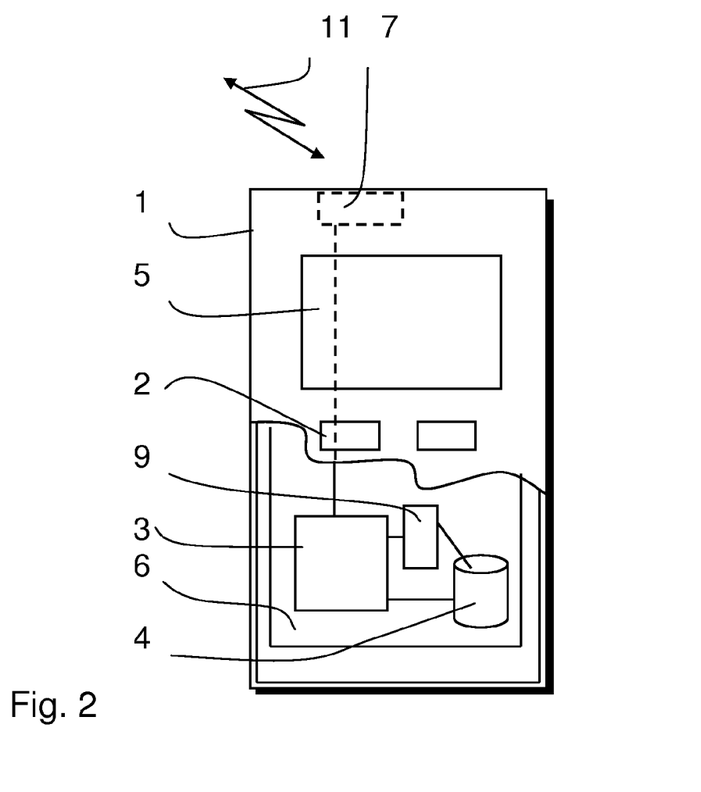
FIG. 2 shows an example of a communication device.

FIG. 2 shows a schematic, partially sectioned view of a communication device 1 that can be used for communication on an aggregated carrier 11 comprising a plurality of component carriers with at least one other wireless station. An appropriate mobile communication device may be provided by any device capable of sending and receiving radio signals. Non-limiting examples include a mobile station (MS) such as a mobile phone or smart phone, a portable computer provided with a wireless interface card or other wireless interface facility, personal data assistant (PDA) provided with wireless communication capabilities, or any combinations of these or the like.

A mobile communication device may be used for voice and video calls, for accessing service applications provided via a data network. The mobile device 1 may receive signals via appropriate apparatus for receiving and transmitting radio signals on wireless carriers, or radio bearers. In FIG. 2 a transceiver is designated schematically by block 7. The transceiver may be provided for example by means of a radio part and associated antenna arrangement. The antenna arrangement may be arranged internally or externally to the mobile device. A mobile device is also typically provided with at least one data processing entity 3, at least one memory 4 and other possible components 9 for use in tasks it is designed to perform. The data processing, storage and other entities can be provided on an appropriate circuit board and/or in chipsets. This feature is denoted by reference 6. The user may control the operation of the mobile device by means of a suitable user interface such as key pad 2, voice commands, touch sensitive screen or pad, combinations thereof or the like. A display 5, a speaker and a microphone are also typically provided. Furthermore, a mobile device may comprise appropriate connectors (either wired or wireless) to other devices and/or for connecting external accessories, for example hands-free equipment, thereto.

Figure 3:
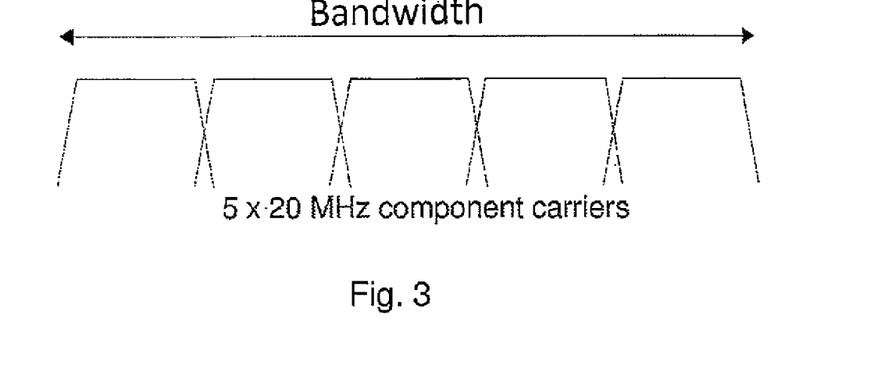
FIG. 3 shows an example of an aggregated carrier.

The principle of carrier aggregation is illustrated in FIG. 3 showing use of five component carriers to form system bandwidth. As explained above, 3GPP LTE Release 8 provides only one carrier and compatible terminals are assumed to be served by a stand-alone component carrier. However, 3GPP LTE-Advanced terminals adapted for operation in accordance with release 9 and upwards can receive or transmit simultaneously on multiple aggregated component carriers in the same transmission time interval (TTI). That is, two or more carriers, referred to herein as component carriers can be aggregated such that a communication device may simultaneously communicate one or multiple component carriers depending on its capabilities. It is noted that the component carriers of an aggregated carrier can be provided by different cells.

For example, an LTE-Advanced mobile communication device with reception capability beyond 20 MHz can simultaneously receive on multiple 20 MHz component carriers. In the shown example a plurality of release 8 bandwidth "chunks", or component carriers, are combined together to form M×release 8 bandwidth (BW). In the example M=5, resulting 5×20 MHz=100 MHz bandwidth.

A particular example will now be discussed with reference to FIGS. 5 and 6.

Figure 5:
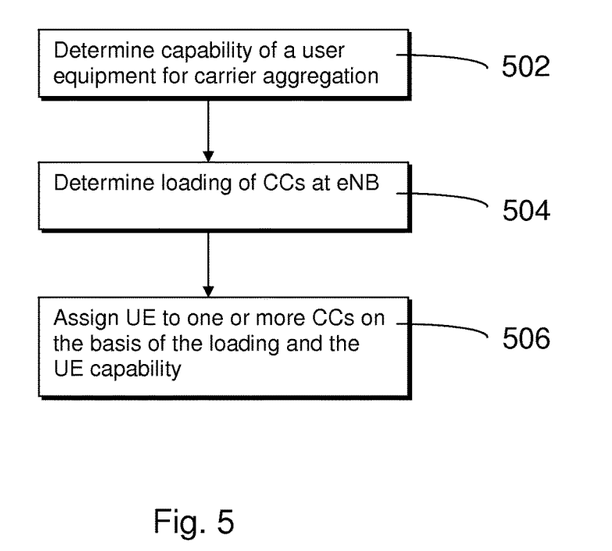
FIG. 5 shows a schematic flow diagram according to some embodiments.

FIG. 5 discloses a schematic flow diagram according to some embodiments. FIG. 6 shows a signaling flow diagram between the user equipment and the eNode B according to some embodiments.

A processor 14 of the controller 13 of the eNode B 12 receives a request for connection from a user equipment 1. The step of the eNode B 12 receiving the request for connection from the user equipment 1 is shown in step 602 in FIG. 6.

When the processor 14 receives the request for connection, the processor can determine the capability of the user equipment for carrier aggregation as shown in step 502 of FIG. 5. The processor 14 of the eNode B 12 can determine the capability of the user equipment 1 based on information received from the user equipment 1. In some embodiments the information comprising capability of the user equipment 1 for carrier aggregation is comprised in the request for connection. Alternatively in some embodiments information comprising capability of the user equipment 1 for carrier aggregation is obtained from a memory. For example, the user equipment 1 may be requesting reconnection with the eNode B 12 and the eNode B may have previously stored information relating to the user equipment 1.

After determining the capability of the user equipment for carrier aggregation, the processor determines the loading of one or more component carriers at the eNode B 12 as shown in step 504. In some embodiments the step of determining the loading of the component carriers is carried out before the step of determining capability 502. In other embodiments the steps of determining capability of a user equipment for carrier aggregation 502 is carried out at the same time as the step of determining the loading of component carriers at the eNode B 12.

The processor 14 determines the loading of the component carriers by determining the number of user equipments assigned to each component carrier of the eNode B 12. In other embodiments, other means may be used to determine the loading of each of the component carriers. In other embodiments the load of a component carrier is calculated by the processor 14 based on the quality of service (QoS) requirements of the user equipments and/or the user service quality at a user equipment on the component carrier. In some embodiments the load of one or more component carriers is calculated with the following:

$$L(m) = \sum_{i=1}^{nu\_UE(m)} R(i) \cdot Q(i, m) \quad (1)$$

Wherein L(m) is the load of a component carrier, nu_UE(m) is the total number of users in a cell on component carrier m, R(i) is a weighting factor according to the QoS requirements of user equipment i and Q(i,m) is a weighting factor according to the user service quality at a user equipment assigned to component carrier m.

For example in one embodiment a user equipment requires 2 Mbps and has a weighting factor R(i) of 2 whereas a user equipment requiring 1 Mbps has a weighting factor R(i) of 1. The mapping between the weighting factor Q(i,m) and the user service quality at a user equipment may be system dependent. In some embodiments the load of a component carrier may decrease with an increase in user service quality at the user equipment because good service quality may require less resources than poor service quality.

Having determined the loading of the component carriers and the capability of the user equipment for carrier aggregation, the processor 14 initiates assigning the user equipment to one or more component carriers on the basis of the determined loading of the component carriers and the capability of the user equipment 1 as shown in step 506.

In this way the processor assigns the user equipment to one or more component carriers in order to offer allocation fairness among a plurality of user equipments. Advantageously a good multiuser frequency domain packet scheduling (FDPS) gain can be achieved with evenly assigning user equipments to component carriers of the eNode B 12. Furthermore by determining the loading of the component carriers and the capability of user equipment for carrier aggregation before assigning a user equipment to one or more component carriers, maximum benefit from multiuser FDPS gain can be achieved.

In particular, component carriers at the eNode B 12 may have a predetermined number of user equipments to be assigned during operation in order to achieve balanced assignment of user equipment to the component carriers at the eNode B 12. In some cases when a component carrier exceeds a predetermined number of user equipments to be assigned, multiuser frequency domain packet scheduling gain is decreased.

A user equipment may be assigned to some component carriers at the eNode B. By only assigning a user equipment to some component carriers, the loading of a component carrier is not exceeded. In addition a user equipment e.g. LTE-Advanced user equipment receives the same benefit but has a reduced user equipment power consumption and signaling overhead.

In other words, in some embodiments LTE-Advanced user equipments may not be assigned to all component carriers at an eNode B because some component carriers may be oversubscribed or nearly oversubscribed already. By assigning a user equipment to an already oversubscribed component carrier, the user equipment will not experience a good service on the oversubscribed component carrier and further degrade the service for other user equipments already assigned on the oversubscribed component carrier.

Figure 6:
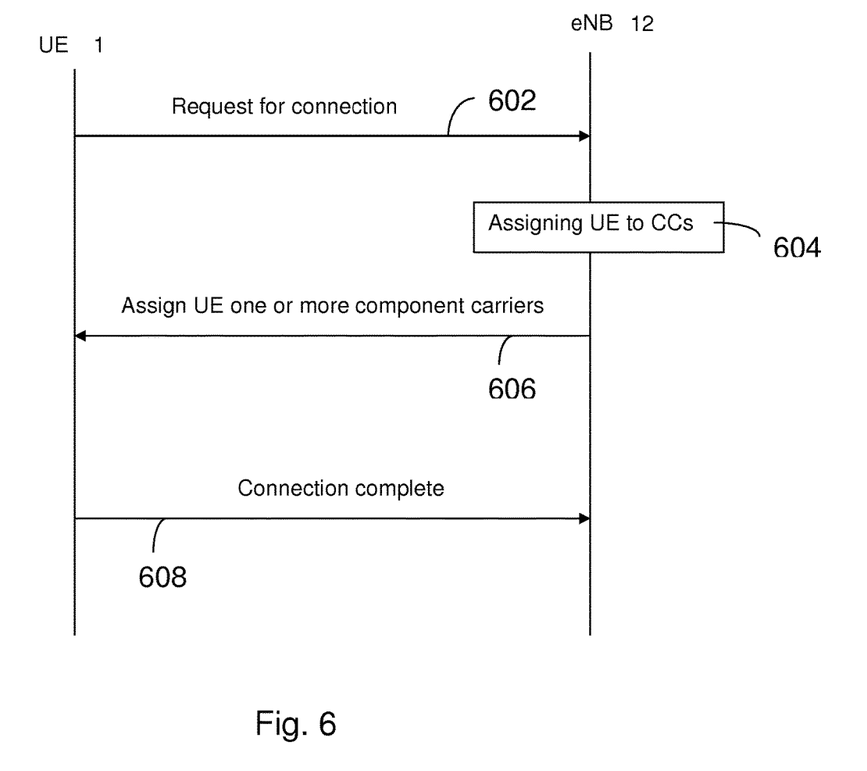
FIG. 6 shows a signaling flow for some embodiments.

FIG. 6 shows the step in the signaling flow where the processor 14 initiates assigning the user equipment to one or more component carriers in step 604. After the processor has initiated assigning the user equipment to one or more component carriers the processor 12 sends a message to the user equipment 1 comprising information of the one or more component carriers that the user equipment is to be assigned to as shown in area 606.

After the user equipment 1 has received a message comprising information regarding assigning the user equipment to one or more component carriers, the user equipment sends a conformation message as shown in 606 comprising information to indicate that the connection is complete. After message 608 is sent to the eNode B 12, the user equipment 1 is assigned to the one or more component carriers.

Figure 7:
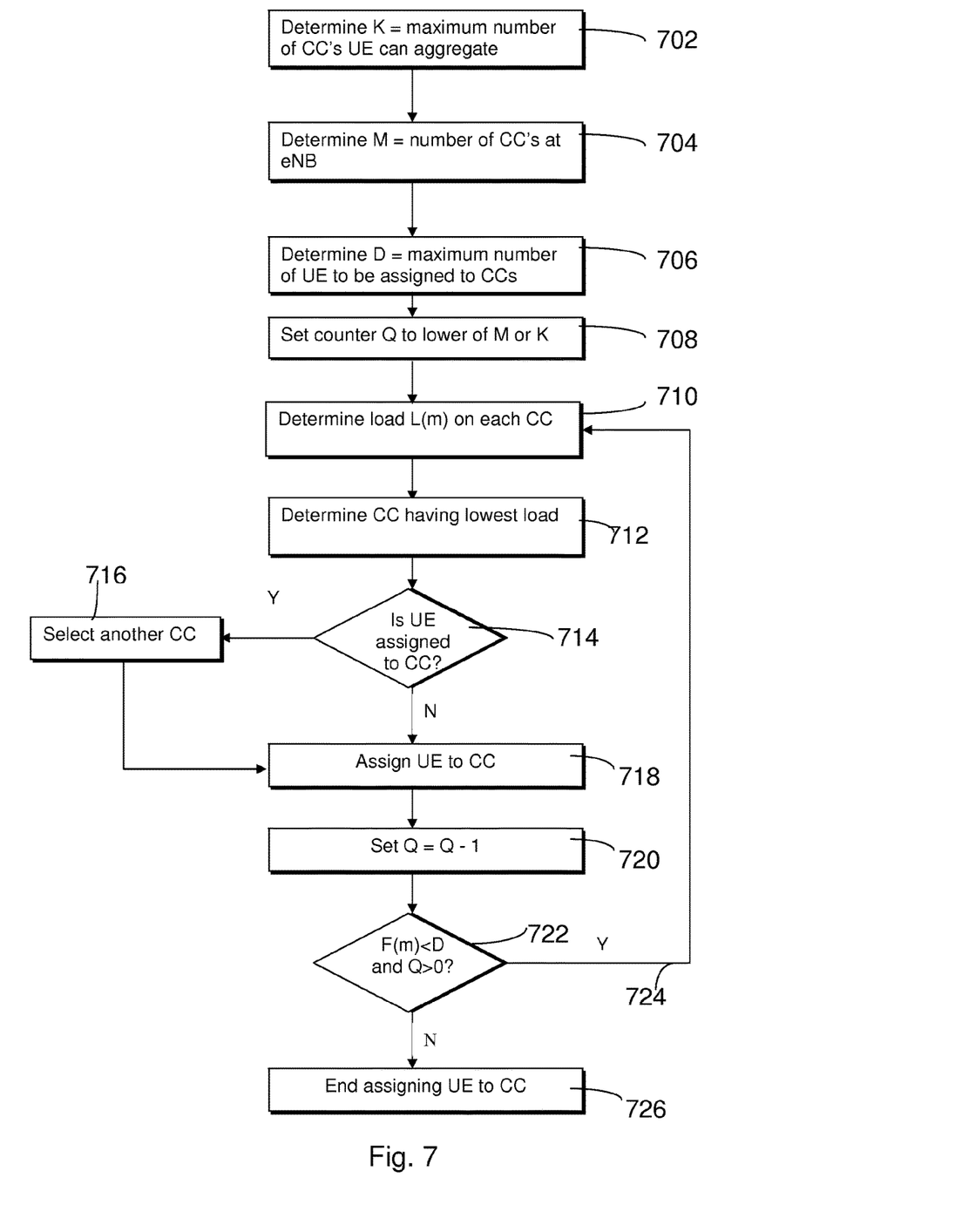
FIGS. 7 and 8 show flow diagrams according to some other embodiments.

FIG. 7 illustrates a flow diagram according to some embodiments. FIG. 7 illustrates the algorithm for assigning user equipment to one or more component carriers in more detail.

The processor 14 of the eNode B 12 determines whether a user equipment 1 can perform carrier aggregation as shown in step 702. On determination that a user equipment can perform carrier aggregation, the processor 14 determines the maximum number of component carriers the user equipment can aggregate. The processor then sets a parameter K to the maximum number of component carriers the user equipment 1 can aggregate. If the user equipment can not perform carrier aggregation, then the processor sets K=1.

The processor 14 then determines the number of component carriers that the eNode B 12 is capable of providing as shown in step 704. On determination of the number of component carriers provided by the eNode B 12 the processor sets a parameter M equal to the number of component carriers at the eNode B 12.

In some embodiments step 704 is not performed because the processor retrieves from memory the number of component carriers at the eNode B 12. However, in other embodiments the processor always performs the step of determining the number of component carriers at the eNode B 12 in case the number of component carriers varies during operation of the eNode B 12. For instance, the number of component carriers at the eNode B 12 may vary due to malfunction or maintenance of the eNode B 12.

In step 706 the processor determines the maximum number of user equipment to be assigned to each component carrier. On determination of the maximum number of user equipments 1 to be assigned to the component carriers, the processor sets a parameter D to the maximum number of user equipments to be assigned to the component carriers.

The parameter D may vary between each component carrier but usually parameter D is the same for each component carrier. Similar to step 704, the step of determining the maximum number of user equipment to be assigned to the component carriers may comprise retrieving parameter D from memory. In some embodiments the parameter D corresponds to a desirable number of user equipments assigned to each component carrier to provide good multi-user frequency domain packet scheduling. In some embodiments the processor sets D=6 to 8.

After determining the initial parameters of the user equipment and the component carriers the processor sets a counter Q to an initial value as shown in step 708. In some embodiments the initial value of counter Q is the lower of parameter M or parameter K.

The processor 14 determines the number of user equipment assigned to each component carrier. The processor 14 stores a variable F(m) at the number of user equipment assigned to each component carrier wherein m equals 1, . . . M. In some embodiments the processor determines the load on each component carrier based on the number of user equipment assigned to each component carrier. The processor may determine the load of each component carrier using equation (1).

Determining the load of each component carrier is shown in step 710. The processor 14 may determine the number of user equipment assigned to each component carrier by interrogating a local registry (not shown) of the eNode B. In some embodiments the base station has a list of currently serving user equipment stored in memory.

After determining the load of each component carrier, the processor 14 determines a component carrier having the lowest load. In this way, by identifying the least subscribed component carriers in the cell, a user equipment requesting connection to a cell can be allocated in a balanced manner. Step 712 shows the processor 14 determining a component carrier having the lowest load assigned to it.

In some embodiments, a user equipment 1 may not be assigned more than once on the same component carrier. In step 714 the processor determines whether the component carrier having the lowest load already has the user equipment assigned to that component carrier. If the user equipment is already assigned to the component carrier, the processor 14 then selects another component carrier as shown in step 716. In some embodiments another component carrier is selected on the basis of having the next lowest load.

Alternatively, if the processor 14 determines that the user equipment 1 is not assigned to the component carrier selected in step 712, then the processor 14 selects the component carrier for the user equipment. The processor assigns the user equipment to the selected component carrier as shown in step 718.

The processor then changes the counter Q after assigning the user equipment 1 to the selected component carrier. The counter Q is set such that it is one less than before as shown in step 720 (e.g. Q=Q-1).

The processor then determines in step 722 whether to repeat assigning the user equipment to additional component carriers or whether to end assigning the user equipment to component carriers.

In particular, the processor 14 determines whether the number of user equipment 1 assigned to each component carrier is still less than the maximum number of user equipment to be assigned to each component carrier for permitting good operation of the cell. The processor will determine for each component carrier whether it is possible to assign a user equipment 1 to further component carriers.

Additionally, the processor determines whether the counter Q is greater than 0. In this way, if the counter Q is less than zero then either the user equipment has reached the maximum number of component carriers the user equipment can aggregate or the user equipment has already been assigned to all the available component carriers at the eNode B. If the user equipment can be assigned to further component carriers the processor repeats the algorithm and returns to step 710 as shown by arrow 724.

If the user equipment is not to be assigned to any further component carriers, the processor ends the assignment algorithm as shown in step 726.

Figure 8:
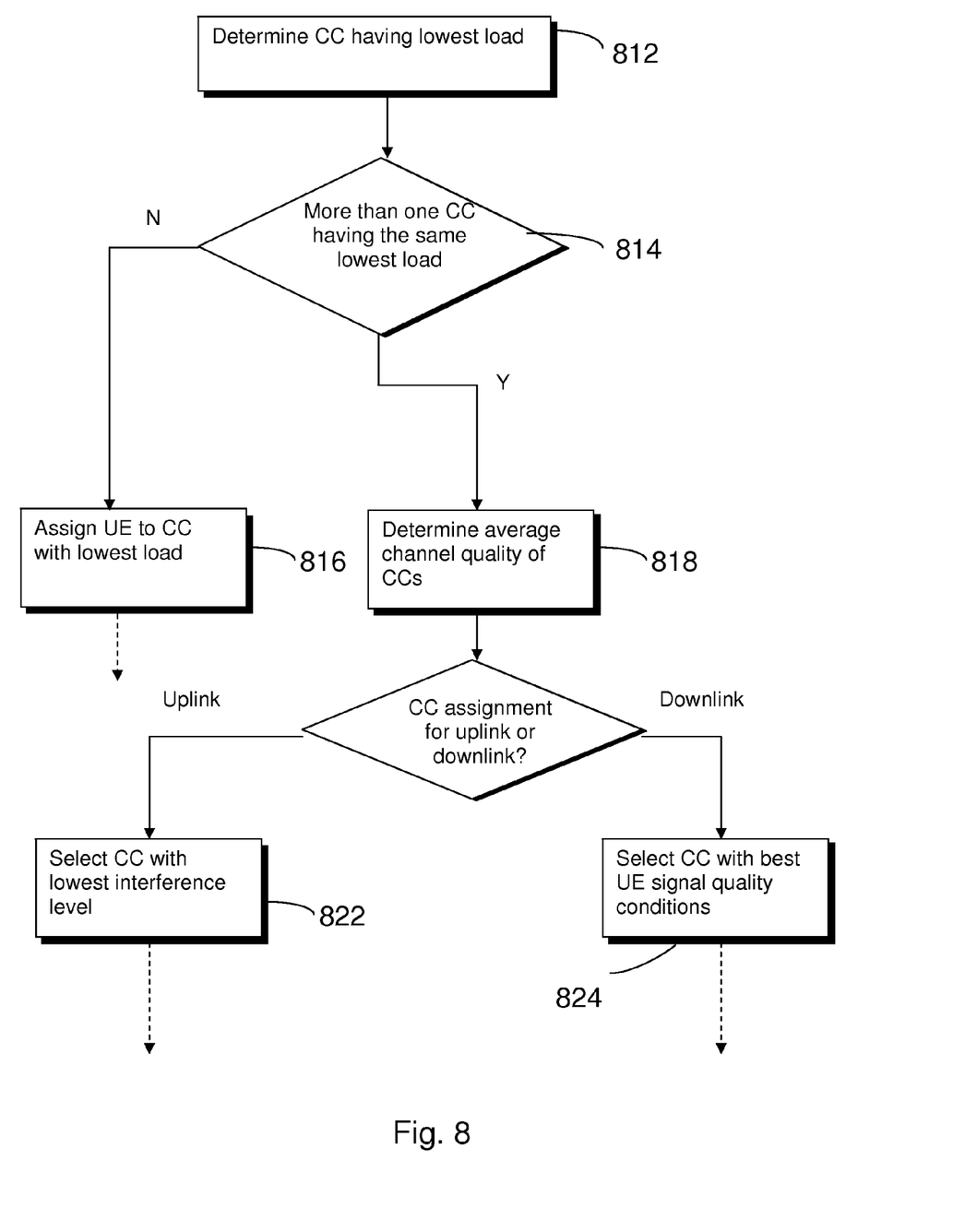

FIG. 8 illustrates a flow diagram for some embodiments. In particular the steps illustrated in FIG. 8 optionally replace step 712 as shown in FIG. 7. The broken arrows shown in FIG. 8 represent continuation of the process shown in FIG. 7 at step 714. Step 812 as shown in FIG. 8 is the same as step 712 as shown in FIG. 7. Step 812 shows that the processor 14 determines a component carrier having the lowest load.

However, in some cases there will be component carriers which have an equal load. In this way, there may be more than one component carrier having the lowest load.

In step 814 the processor 14 determines whether there is more than one component carrier which has the lowest load. If only one component carrier is determined to have the lowest load then the processor proceeds to initiate assigning the user equipment to the component carrier with the lowest load as shown in 816. The processor 14 then continues with the method at step 714 as shown in FIG. 7 after step 816.

If the processor 14 determines in step 814 that more than one component carrier has the lowest load, then the processor 14 needs to determine which component carrier the user equipment should be assigned to on other criteria.

In some embodiments, the processor 14 arbitrarily selects one component carrier which is determined to have an equal lowest load.

In other embodiments the processor determines a parameter relating to channel quality for each of the component carriers as shown in step 818. The parameter relating to channel quality may be a determined average measurement.

If the component carriers which are determined to have an equal lowest load have the same average channel quality, then the processor of the eNode B can randomly select the component carrier for the user equipment. In some embodiments, the processor 14 determines the average channel quality on the basis of one or more factors.

In some other embodiments the quality of one or more component carriers can be additionally or alternatively determined on the basis of an expected receiving throughput for a user equipment 1. The processor 14 determines the expected receiving throughput for a user equipment on the basis of component carrier bandwidth. In this way, a processor can select a component carrier having a wider bandwidth because a user equipment assigned to the component carrier is expected to have a high throughput.

If the average channel quality of the component carriers is not the same, then the processor determines whether the component carrier assignment is for uplink or downlink communication with the user equipment 1 as shown in 820.

On determining that the component carrier assignment is for uplink communication the processor determines which component carrier has the lowest interference level as shown in step 822. The lowest interference level in some embodiments is measured in the uplink by the eNode B as the average received interference power. The average received interference power is determined for each of the component carriers and the processor 14 selects the component carrier with the lowest interference level.

After selecting a component carrier in step 822 the processor continues with the method in FIG. 7 at step 714.

If the processor 14 determines in step 820 that the component carrier assignment is for downlink communication, the processor 14 selects the component carrier with the best user equipment 1 signal quality conditions. The user equipment signal quality conditions can be measured by taking the average of the user equipments channel quality indicator (CQI) or reference signal received quality (RSRQ) for each of the component carriers.

Thereafter the processor continues with the method of FIG. 7 by proceeding to step 714.

Figure 9:
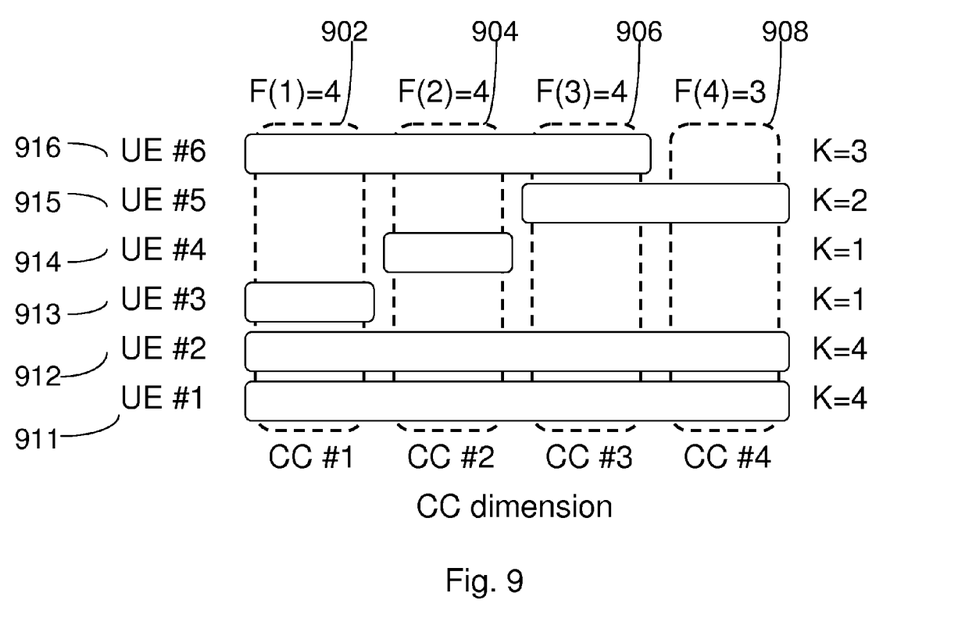
FIGS. 9, 10 and 11 show example assignment of user equipment to one or more component carriers at an eNode B.

FIG. 9 illustrates example loading at an eNode B. The eNode B comprises four component carriers, component carrier 1 902, component carrier 2 904, component carrier 3 906, component carrier 4 908. FIG. 9 further shows six user equipments assigned to one or more component carriers at the eNode B.

Each user equipment is connected to the eNode B at different points in time. Specifically user equipments 1 to 6 connect sequentially to the eNode B for the purpose of explaining the embodiment.

User equipment #1 911 requests a connection with the eNode B 12. Referring to step 702 the processor of the eNode B determines that the maximum number of component carriers user equipment #1 911 can aggregate is 4. This is represented by K=4 on the same line as user equipment as shown in FIG. 9.

The processor 14 then determines that M=4 because there are four component carriers in shown in FIG. 9 and the maximum number of user equipments to be assigned to each component carrier is 6 (D=6). This corresponds to the steps carried out in 704 and 706 as shown in FIG. 7.

The processor 14 then sets counter Q in 708 to Q=4 because both M=4 and K=4. The processor 14 then determines that the number of user equipments assigned to each component carrier is 0 as shown in step 710. This is because when user equipment #1 911 attempts to connect to eNode B no other user equipments are attached to the eNode B. In this way F(m)=0 for each component carrier.

In this embodiment the load L(m) of each component carrier is determined as the number of user equipment F(m) assigned to each component carrier. That is, the load L(m) =F(m). In alternative embodiments, the load L(m) may be determined on the basis of additional factors, such as quality of service and/or channel quality as described in previous embodiments.

The processor then determines that each of the component carriers 902, 904, 906 and 908 have the lowest number of user equipment assigned to them as shown in step 712.

Since no user equipments are attached to any of the component carriers at the eNode B, the processor 14 determines that the user equipment #1 911 is not previously assigned to any of the component carriers. The processor 14 then proceeds to assign the user equipment #1 911 to component carrier #1 902 as shown in 718.

The processor adjusts the counter Q to Q=3 in step 720. In step 722 the processor determines that F(m)<D is true because F(m)=1 for component carrier #1 902 and F(m)=0 for all the other component carriers. In step 722 the processor also determines that Q>0 is true because Q=3 as mentioned previously.

In this way since more component carriers can be assigned, the processor 14 returns to assigning the user equipment to additional component carriers in step 710. In this way, the processor repeats the steps of assigning the user equipment #1 911 to all the other component carriers 904, 906 and 908 in the eNode B. The processor 14 stops assigning the user equipment #1 to component carriers when the processor determines that Q>0 is not true. In other words, the processor 14 stops assigning the user equipment #1 to any more component carriers because the user equipment #1 cannot support carrier aggregation of any more component carriers.

User equipment #2 912 then requests connection with the eNode B. Similar to the procedure with user equipment #1 911 the user equipment #2 912 is assigned to each of the component carriers because each component carrier has capacity to be assigned additional user equipments.

User equipment #3 913 is only assigned to one component carrier 902. This is because the maximum number of component carriers which the user equipment can aggregate is 1. That is user equipment 3 913 cannot perform carrier aggregation of component carriers. In this way a counter Q is set to Q=1 in step 708. This means by virtue of step 712 counter Q equals zero and user equipment #3 913 is not assigned to any additional component carriers because the processor determines in step 722 that Q>0 is not true. After determining Q>0 is not true, the processor 14 ends the process as shown in step 726.

User equipment #4 914 also attempts to connect to the eNode B. Similar to user equipment #3 913 user equipment #4 914 does not support carrier aggregation. However, user equipment 4 914 is not assigned to component carrier #1 902 because user equipment #3 913, user equipment #2 912 and user equipment #1 911 have previously been assigned to component carrier #1.

In this way the processor 14 determines in step 712 when user equipment #4 914 connects to the eNode B that the component carriers having the lowest number of user equipments assigned to them are component carrier #2 904, component carrier #3 906 and component carrier #4 908 (each having two user equipments being previously assigned to them). In this way user equipment #4 is assigned to component carrier #2.

User equipment #5 915 can support a maximum aggregation of two component carriers and is therefore assigned to component carrier #3 906 and component carrier #4 908 because these carriers have the lowest number of user equipments assigned to them at this time.

User equipment #6 916 has a maximum number of component carriers the user equipment can aggregate as three. The processor 14 in step 712 determines that each of the component carriers when user equipment #6 916 attempts to connect to the eNode B has three user equipments (F(m)=3) assigned to each component carrier. All the component carriers are equal and so the processor arbitrarily assigns user equipment #6 916 is assigned to component carriers #1 to #3.

FIG. 9 is an exemplary embodiment wherein the eNode B has a low loading and each user equipment can be assigned to the maximum number of component carriers which each user equipment can support carrier aggregation for.

Figure 10:
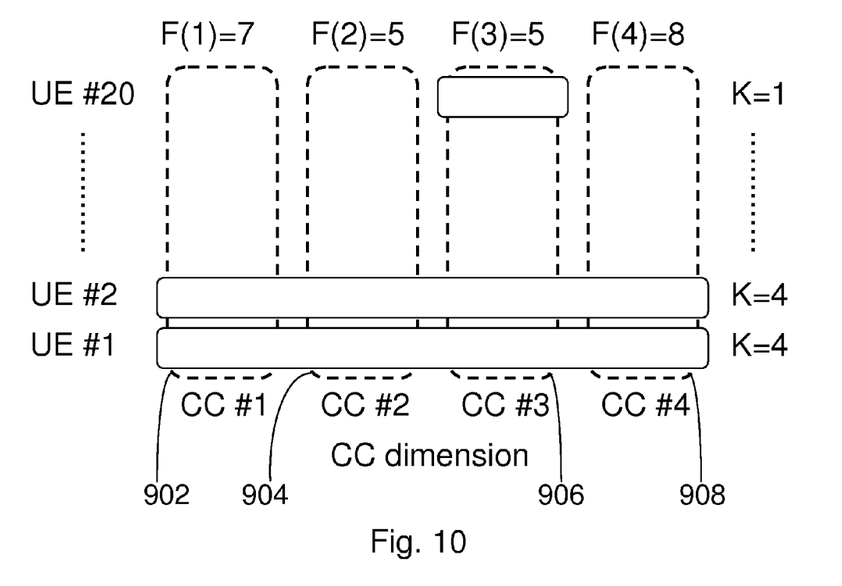

FIG. 10 illustrates an example of loading at the eNode B. FIG. 10 is similar to FIG. 9 except that FIG. 10 illustrates a medium load case. FIG. 10 has 20 user equipments assigned to one or more component carriers.

The processor 14 determines the number of user equipment assigned to each component carriers in step 710 is F(m)=7 for component carrier #1 902, F(m)=5 for component carrier #2 904, F(m)=5 for component carrier #3 906 and F(m)=8 for component carrier #4 908.

Only component carriers #2 and #3, 904, 906, have less than the predetermined number maximum of user equipments D=6. The component carriers #1 and #4 have more than the maximum number of user equipments to assign to each component carrier.

The processor 14 assigns the user equipment to component carrier #2 in step 718. The processor determines in step 722 that F(m)<D is true for component carrier #3 906 and repeats the procedure such that the user equipment is assigned in to component carrier #3 in step 718. Thereafter in step 722, the processor 14 determines that F(m)<D is false and the processor ends the assignment as shown in step 726.

In the embodiment shown in FIG. 10 when a new LTE-Advanced user equipment with a carrier aggregation capability K=4 enters the cell, the processor 14 will only assign the user equipment to component carriers #2 and #3 because component carriers #2 and #3 are the only component carriers with spare capacity.

Potentially the LTE-Advance user equipment could be assigned to all four component carriers #1 to #4. However the LTE-Advance user equipment is assigned only to two component carriers which provides more efficient power consumption and signaling overhead for the user equipment. Even if the LTE-Advance user equipment is assigned to all component carriers, system performance cannot be improved because there are already enough user equipments on all the component carriers to fully benefit from FDPS.

Figure 11:
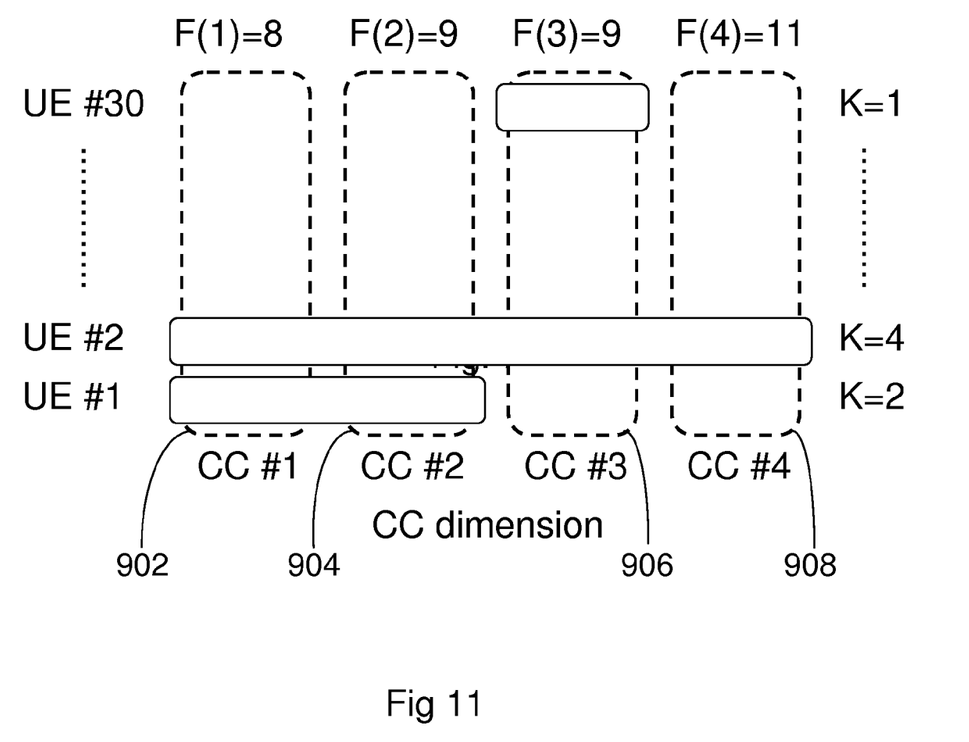

FIG. 11 illustrates a loading example at an eNode B. FIG. 11 is similar to FIGS. 9 and 10 except that the eNode B has a high loading. If a new user equipment were to request convection to the eNode B, the processor in step 710 would determine that the number of user equipments assigned to each component carrier is F(m)=8 for component carrier #1 902, F(m)=9 for component carrier #2 904, F(m)=9 for component carrier #3 906 and F(m)=11 for component carrier #4 908.

The processor 14 determines in step 712 that the component carrier having the lowest number of user equipment assigned to it is component carrier #1 902. The processor 14 assigns the user equipment to component carrier #1 902 as shown in step 718 similar to previous embodiments. However in step 722, the processor 14 determines that F(m)<D is false and the processor ends the assignment as shown in step 726.

It is noted that whilst embodiments have been described in relation to LTE-Advanced, similar principles can be applied to any other communication system where a carrier comprising a multiple of component carriers is employed. Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more of any of the other embodiments previously discussed.

The invention claimed is:

1. A method comprising:
   determining, by a network device, a capability of a user equipment to support carrier aggregation of a plurality of component carriers, wherein determining the capability comprises determining a maximum number of component carriers of the plurality of component carriers the user equipment can support in the carrier aggregation;
   based on the determined capability of the user equipment to support the carrier aggregation, determining, by the network device, loading of each component carrier of the plurality of component carriers, wherein determining the loading comprises determining a number of user equipment assigned to the each component carrier of the plurality of component carriers, and determining a loading limit for the each component carrier, wherein the loading limit is based on a maximum number of the user equipment that can be supported by the each component carrier of the plurality of component carriers;
   based on the determined loading and the determined loading limit, determining which one or more component carriers of the plurality of component carriers has a lowest loading; and
   assigning, by the network device, the user equipment to the one or more component carriers of the plurality of component carriers that has the lowest loading based on determining the capability, determining the loading, and determining the loading limit.

2. The method according to claim 1, wherein the network device is embodied in a base station.

3. The method according to claim 1, wherein the loading is determined on a basis of at least one of a required quality of service of the user equipment, and user service quality on the each component carrier of the plurality of component carriers.

4. The method according to claim 1, wherein the assigning the user equipment to the one or more component carriers is repeated when a loading of the one or more component carriers of the plurality of component carriers is below the determined loading limit.

5. The method according to claim 1, wherein the assigning the user equipment to the one or more component carriers is repeated when a number of component carriers assigned to the user equipment is below the maximum number of component carriers the user equipment can support in the carrier aggregation.

6. The method according to claim 1, wherein when there is more than one component carrier with the lowest loading, the determining comprises determining another parameter of the more than one component carrier with the lowest loading.

7. The method according to claim 6, wherein the another parameter is one or more channel quality parameters relating to the more than one component carrier with the lowest loading.

8. The method according to claim 7, wherein the assigning comprises assigning the user equipment to a component carrier when the one or more channel quality parameters meet a predetermined level.

9. The method according to claim 7, wherein the one or more channel quality parameters are one or more of received interference power, bandwidth of the more than one component carrier, and signal quality condition.

10. The method according to claim 1, wherein the assigning comprises assigning the user equipment to a single component carrier when the user equipment is determined not to support the carrier aggregation.

11. The method according to claim 1, wherein if the user equipment is already assigned to a component carrier that has the lowest loading, then the assigning comprises assigning the user equipment to a component carrier with a next lowest load.

12. An apparatus comprising:
    at least one processor; and
    at least one memory including computer program code;
       the at least one memory and the computer program code configured to, with the at least one processor, cause the apparatus at least to:
    determine a capability of a user equipment to support carrier aggregation of a plurality of component carriers, wherein determining the capability comprises determining a maximum number of component carriers of the plurality of component carriers the user equipment can support in the carrier aggregation;
    based on the determined capability of the user equipment to support the carrier aggregation, determine loading of component carrier of the plurality of component carriers, wherein determining the loading comprises determining a number of user equipment assigned to the each component carrier of the plurality of component carriers, and determining a loading limit for the each component carrier, wherein the loading limit is based on a maximum number of the user equipment that can be supported by the each component carrier of the plurality of component carriers;
    based on the determined loading and the determined loading limit, determining which one or more component carrier of the plurality of component carriers has a lowest loading; and
    assign the user equipment to the one or more component carriers of the plurality of component carriers that has the lowest loading based on determining the capability, determining the loading, and determining the loading limit.

13. The apparatus according to claim 12, wherein the loading is determined on a basis of at least one of a required quality of service of the user equipment, and user service quality on each component carrier.

14. The apparatus according to claim 12, wherein the at least one memory including the computer program code is configured with the at least one processor to cause the apparatus to repeat the assigning the user equipment to the one or more component carriers when a loading of the one or more component carriers of the plurality of component carriers is below the determined loading limit.

15. The apparatus according to claim 12, wherein the at least one memory including the computer program code is configured with the at least one processor to cause the apparatus to repeat the assigning the user equipment to the one or more component carriers when a number of component carriers assigned to the user equipment device is below the maximum number of component carriers the user equipment can support in the carrier aggregation.

16. The apparatus according to claim 12, wherein when the processor determines that there is more than one component carrier with the lowest loading, the processor is configured to determine another parameter of the more than one component carrier with the lowest loading.

17. The apparatus according to claim 16, wherein the another parameter is one or more channel quality parameters relating to the more than one component carrier with the lowest loading.

18. The apparatus according to claim 17, wherein the assigning comprises assigning the user equipment to a component carrier when the one or more channel quality parameters meet a predetermined level.

19. The apparatus according to claim 17, wherein the one or more channel quality parameters are one or more of received interference power, bandwidth of the more than one component carrier, and signal quality condition.

20. The apparatus according to claim 12, wherein the at least one memory including the computer program code is configured with the at least one processor to cause the apparatus to assign the user equipment to one component carrier when the user equipment is determined not to support the carrier aggregation.

21. The apparatus according to claim 12 embodying a base station.

22. The apparatus according to claim 21, wherein the base station is an eNode B.

* * * * *

UNITED STATES PATENT AND TRADEMARK OFFICE
CERTIFICATE OF CORRECTION

PATENT NO. : 9,548,850 B2
APPLICATION NO. : 13/578374
DATED : January 17, 2017
INVENTOR(S) : Klaus Ingemann Pedersen and Yuanye Wang

Page 1 of 1

It is certified that error appears in the above-identified patent and that said Letters Patent is hereby corrected as shown below:

In the Claims

In Claim 12:
Column 16, Line 27, "of" should be deleted and -- of each -- should be inserted.

Signed and Sealed this
Seventh Day of March, 2017

Michelle K. Lee
*Director of the United States Patent and Trademark Office*